United States Patent
Berger

(10) Patent No.: US 6,767,280 B1
(45) Date of Patent: Jul. 27, 2004

(54) CORRUGATED FLEXIBLE CONDUIT CONNECTOR

(76) Inventor: Edwin L. Berger, 115 Albany Ave., Amityville, NY (US) 11701

( * ) Notice: Subject to any disclaimer, the term of this patent is extended or adjusted under 35 U.S.C. 154(b) by 0 days.

(21) Appl. No.: 10/618,231

(22) Filed: Jul. 14, 2003

(51) Int. Cl.[7] .................................................. F24F 7/00
(52) U.S. Cl. .................... 454/339; 285/136.1; 285/305; 285/419; 285/903; 454/341
(58) Field of Search ................................ 454/339, 341, 454/353, 358, 359, 360, 367; 285/136.1, 305, 419, 903

(56) References Cited

U.S. PATENT DOCUMENTS

| | | | | |
|---|---|---|---|---|
| 3,851,901 A | * | 12/1974 | Sills ........................... 285/112 |
| 4,286,808 A | * | 9/1981 | Fouss et al. ............. 285/140.1 |
| 4,443,031 A | * | 4/1984 | Borsh et al. ................. 285/419 |
| 4,619,332 A | * | 10/1986 | Sheehan .................... 174/65 R |
| 4,829,145 A | * | 5/1989 | Mitchell et al. .......... 174/65 G |
| 6,149,516 A | | 11/2000 | Mantyla |
| 6,406,068 B1 | * | 6/2002 | Bartholoma et al. ........ 285/210 |
| 6,568,716 B1 | * | 5/2003 | Fieber ........................ 285/305 |

* cited by examiner

Primary Examiner—Harold Joyce
(74) Attorney, Agent, or Firm—Myron Amer, PC

(57) ABSTRACT

In a method of exhausting an interior room to atmosphere through a corrugated conduit, the use of a connector which is attached to the corrugated conduit by tongues seated in the recesses of the conduit corrugations as a result of a telescoping together of the connector and conduit, the tongues preventing opposite direction untelescoping and obviating leakage-promoting crushing of the corrugations as might result from using a clamp.

1 Claim, 3 Drawing Sheets

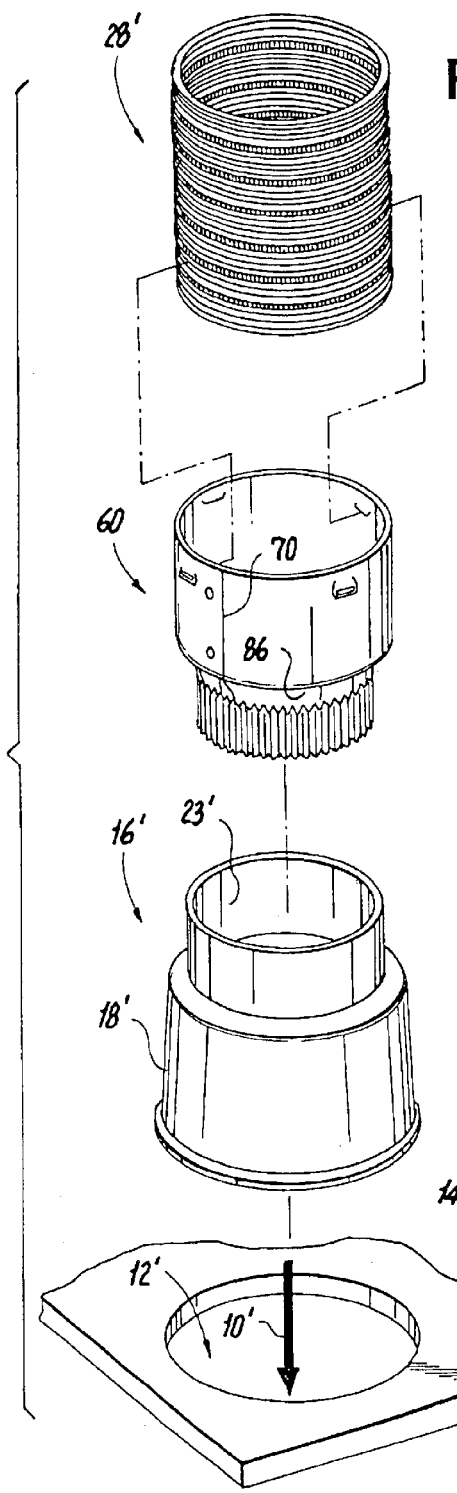
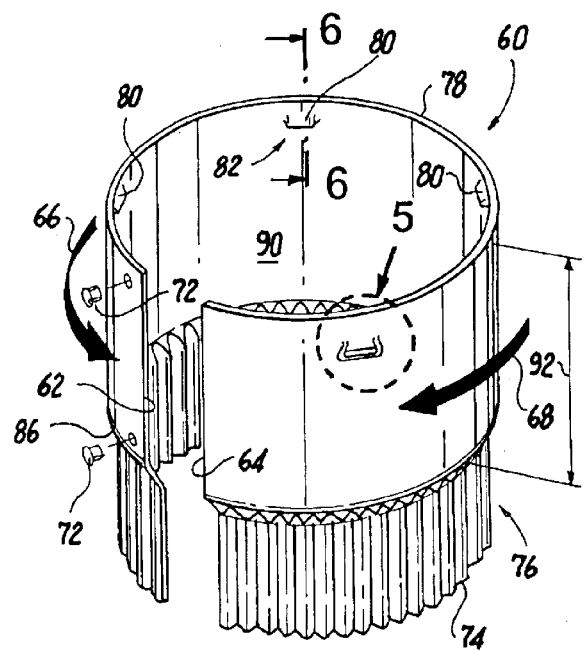
FIG. 3
FIG. 4

CORRUGATED FLEXIBLE CONDUIT CONNECTOR

The present invention relates generally to improvements in a gas exhaust or venting system of rooms of a dwelling, such as of a bathroom or kitchen, wherein the improvements reside in a connector interposed between the outlet of a corrugated conduit extending from the rooms and the soffit outlet opening of the venting system.

EXAMPLE OF THE PRIOR ART

U.S. Pat. No. 6,149,516 for "Soffit Vent Apparatus" issued to Mantyla on Nov. 21, 2000 describes and illustrates a gas venting system from an enclosure to the external environment, i.e., from a dwelling to atmosphere, and the requirements of such a system. One requirement, among many, is the use of a corrugated conduit, the corrugations of which permit flexuring around objects or assuming bends in the flow path, and expanding and contracting in length, as circumstances dictate. The input end of the conduit is, of course, in communication with the room from which odors or stale air are being removed, and the outlet conduit end is connected to tubing extending inboard of the exhaust opening, such opening being typically located in the dwelling soffit.

The current practice, as used in the '516 patent and all other known patents is to use a spring clamp in connecting the corrugated conduit outlet to the exhaust opening tubing. Although the exhaust opening tubing is of non-corrugated or flat metal construction material the radial force applied by the spring clamp is of no adverse effect on the tubing, but this is not the case with the corrugated construction material bounding the conduit outlet opening. Such construction material is deformed and experiences crushing under the applied radial force, and undesirable leakage thus results in the venting system.

Broadly, it is an object of the present invention to overcome the foregoing and other shortcomings of the prior art.

More particularly, it is an object to use to advantage the corrugated nature of the conduit to obviate its inadvertent detachment in the venting system, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 3 is a view similar to FIG. 1 but illustrating the method of the present invention;

FIG. 4 is a view similar to FIG. 2 but of a component used in the method of FIG. 3;

Figures 1, 2:
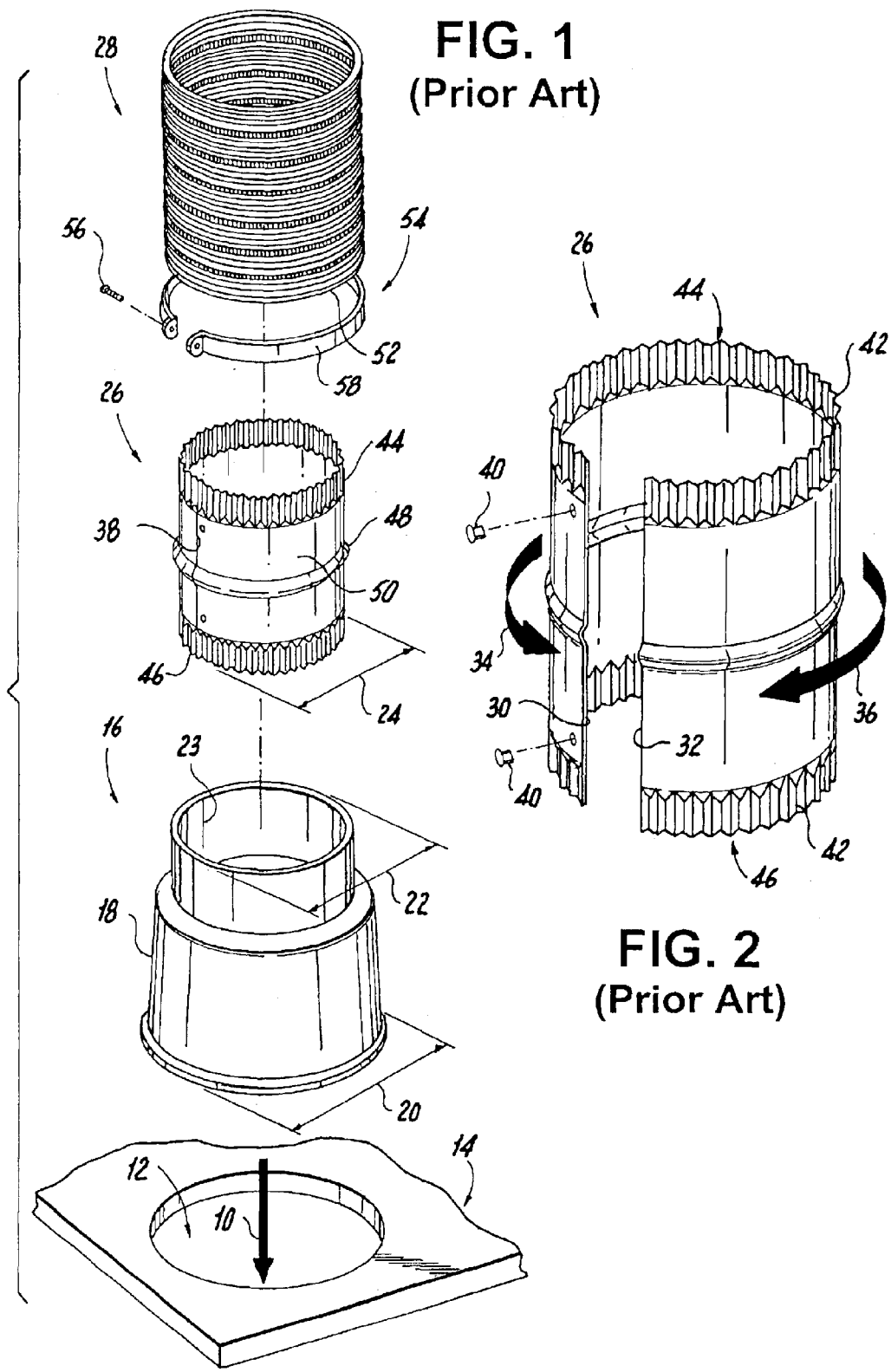
FIG. 1 is an exploded perspective view of a prior art method of exhausting to atmosphere rooms, such as a bathroom, of a dwelling.
FIG. 2 is a perspective view of a component used in the method of FIG. 1.
Figure 5:
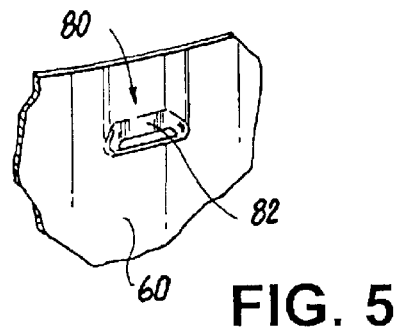
FIG. 5 is a detail view of a structural feature circumscribed by the arrow 5 of FIG. 4.
Figure 6:
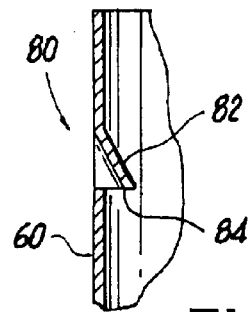
FIG. 6 is a sectional view as seen along line 6—6 of FIG. 4.
Figure 7:
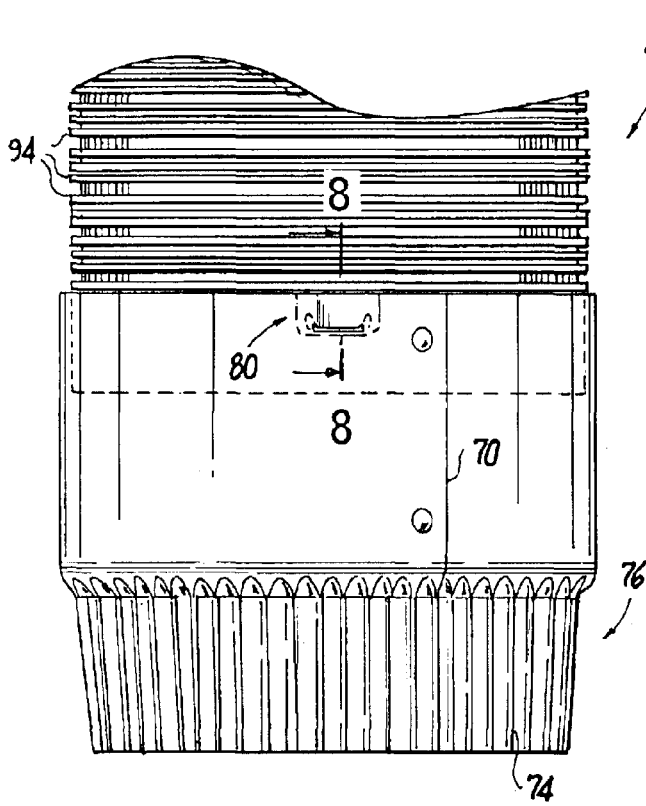
FIG. 7 is an isolated partial front elevational view, on an enlarged scale, of the component of FIG. 4 illustrated in a completed condition.
Figure 8:
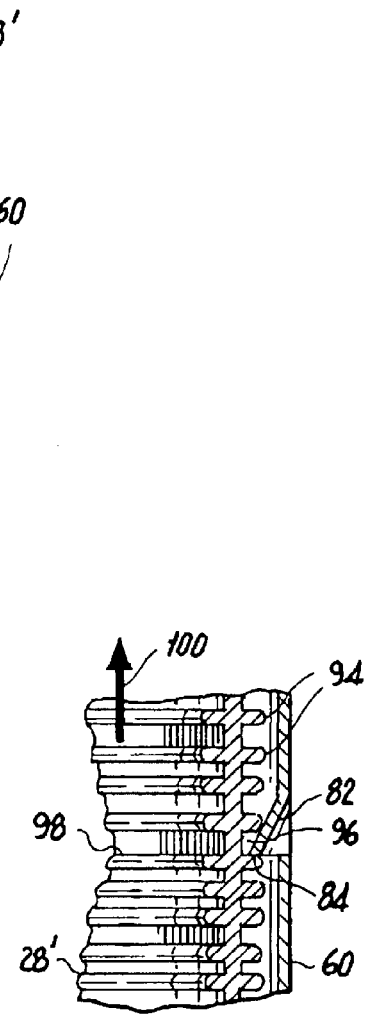
FIG. 8 is a partial sectional view as seen along line 8—8 of FIG. 7.

As background, reference should be had to FIGS. 1 and 2 illustrating a current method of venting or exhausting to atmosphere, as noted at 10, a room interior in a dwelling, such as a bathroom, kitchen or the like, through an opening 12 in a soffit 14, wherein there is mounted as a closure, generally designated 16, over the opening 12, a cylindrical tube 18 of metal construction material of a first large diameter end 20 and a second smaller diameter end 22, the latter sized to match the diameter 24 of a connector 26 interposed between the smaller tube end 23 and a corrugated conduit 28 connected to extend to the interior room (not shown) being vented of stale air, or odors or the like.

The connector 26 is of a thin gauge aluminum construction material formed, as best understood from FIG. 2, from the flat into a cylindrical shape by opposite sides 30 and 32 joined in the directions 34 and 36 in slightly overlapped relation, as noted at 38 in FIG. 1, and held in their overlapped relation by two rivets 40. The construction of connector 26 is completed by fluting, i.e., undulations and recesses, individually and collectively designated 42 oriented lengthwise of the connector 26 and circumferentially spaced about the peripheral opposite end edges 44 and 46.

Thusly constructed, the connector 26 is inserted within the tube end 23 up to the circular stop 48 imparted by the overlapping, and the exposed end 50 of the connector 26 is attached to the inboard end 52 of the conduit 28 using a spring clamp means 54. A drawback using the spring clamp means 54 is that the radial force exerted by the tightening of the screw 56 which draws the clamp body 58 in encircling relation about the conduit end 52 and fluted peripheral edge 44 is required to be of an extent effective to prevent leakage, and this extent of pressure inadvertently causes deformation of the thin gauge aluminum construction material.

As a solution, reference should be had to the venting or exhausting method of the present invention illustrated in FIGS. 3–8, in which the same structural features noted in connection with FIGS. 1 and 2 are designated by the same, but primed, reference numerals, consisting specifically of the primed numbers 10', 12', 14', 16', 18', 23' and 28'.

The advance over the prior art consists primarily in the construction and method of use of the connector 60. In the FIG. 4 connector 60, it is likewise of thin gauge construction material formed from the flat into a cylindrical shape by opposite sides 62 and 64 joined in the directions 66 and 68 in slightly overlapped relation, as noted at 70, and held in their overlapped relation by two rivets 72. In this embodiment of the connector 60 only the bottom or lower peripheral edge 74 is fluted, i.e., provided with undulations and recesses, individually and collectively designated 76 oriented lengthwise of the connector 60 and circumferentially spaced about the edge 74. The upper edge 78 is not fluted, but at circumferentially spaced apart locations, individually and collectively designated 80, a tongue 82 at each location 80 is deformed outwardly of the plane of the construction material into an angular configuration in the direction of the fluted end 74 and presenting a gripping edge 84.

In use, the connector 60 is inserted within the tube end 23' up to an angled wall 86 serving as a stop, there being a friction fit gas seal readily established between the intermitting fluting 76 and the tube end 23', as permitted by the changing diameter adjustments of the fluting 76 to the diameter of the tube end 23'. Following this, the corrugated conduit 28' is inserted within the interior 90 of the exposed length portion 92 of the connector 60. As a consequence, and as best understood from FIGS. 5–8, the corrugations 94 slip along the angle of the tongues 82 until a recess 96 is reached into which tongue edge 84 seats, as noted in FIG. 8 against the next encountered corrugation 98. As a result, the conduit 28' cannot be withdrawn in the direction 100, which is the direction that would disconnect the conduit 28' from the connector 60 and would be undesirable. There is thus provided a condition of interconnection between the connector 60 and conduit 28' achieved without a spring clamp means or an equivalent that causes deformation of the construction material of the interconnected components, and through which deformation there could be leakage or failure of the seal provided by the components.

While the apparatus for practicing the within inventive method, as well as said method herein shown and disclosed in detail is filly capable of attaining the objects and providing the advantages hereinbefor stated, it is to be understood that it is merely illustrative of the presently preferred embodiment of the invention and that no limitations are intended to the detail of construction or design herein shown other than as defined in the appended claim.

What is claimed is:

1. A method of exhausting gas from the interior of a dwelling to atmosphere comprising the steps of:
  A. providing edges in a surface of said dwelling bounding an exhaust opening;
  B. mounting a closure over said exhaust opening including an inboard extending cylindrical tube of metal construction material of a specified diameter;
  C. fabricating a connector for attachment to said tube
    1) using a rectangular strip in the flat of thin gauge aluminum construction material having first and second elongated side edges;
    2) fluting a first side edge with longitudinally oriented alternating undulations and recesses;
    3) imparting spaced apart tongues in adjacent position and along said second side edge by bending out of a plane of said strip construction material to form angularly oriented configurations thereof; and
    4) forming a cylindrical configuration of said strip by overlapping confronting ends of length portions of said fluting, said cylindrical configuration having
      (a) a diameter slightly oversized with respect to said diameter of said mounted closure cylindrical tube, and
      (b) said tongues positioned internally thereof and inclined in the direction of said first side edge;
  D. telescoping said fluted end of said connector in attached relation to said mounted closure cylindrical tube;
  E. using a conduit of thin gauge aluminum construction material characterized by alternation undulations and recesses formed axially thereof imparting flexuring and expansion and contraction degrees of movement to said conduit; and
  F. telescoping an end of said conduit within said connector as permitted by said undulations of said conduit slipping over said tongues until free ends of said tongues seat in an encountered conduit recess completing an attachment of said conduit to said connector;

whereby obviated are forces that are applied in attaching said connector in place as might cause damage to said conduit.

\* \* \* \* \*